UNITED STATES PATENT OFFICE.

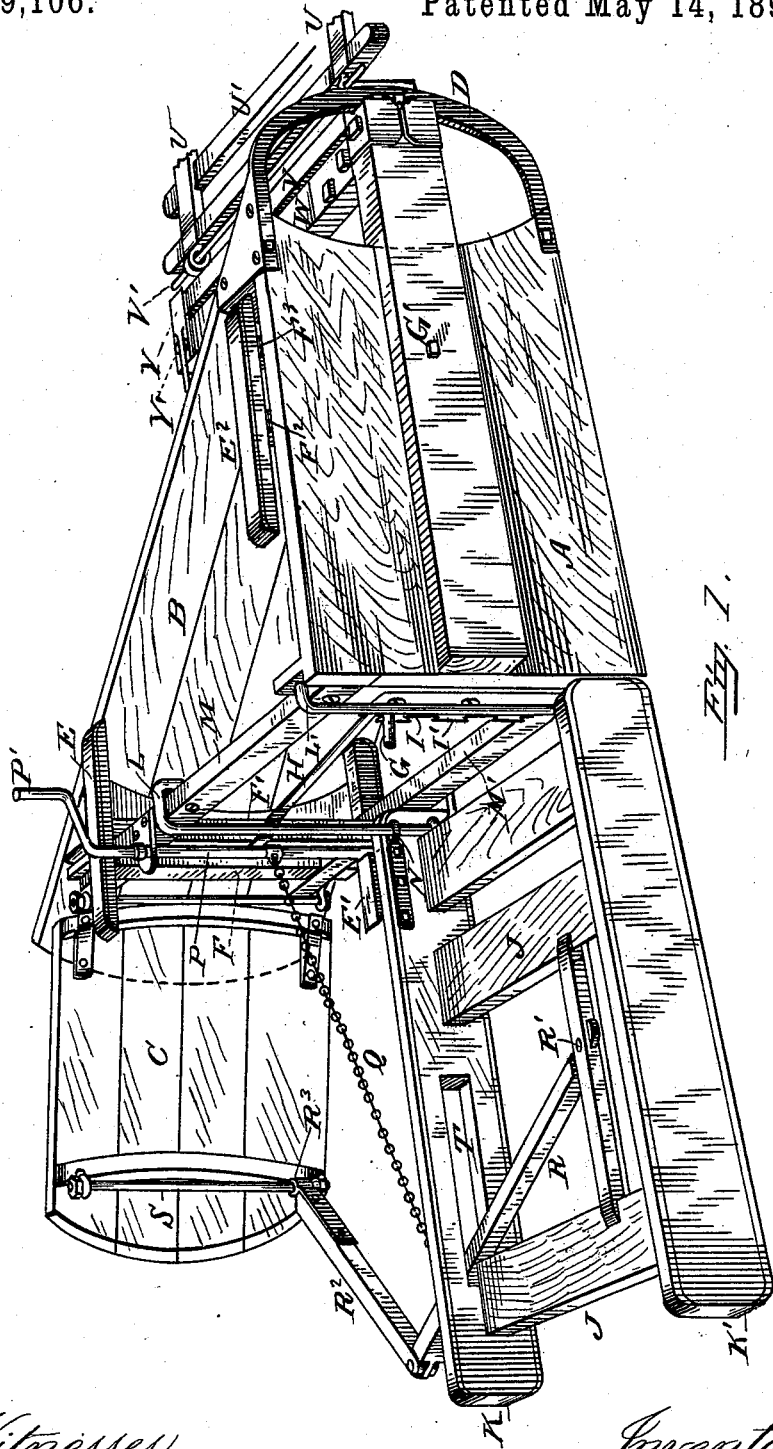

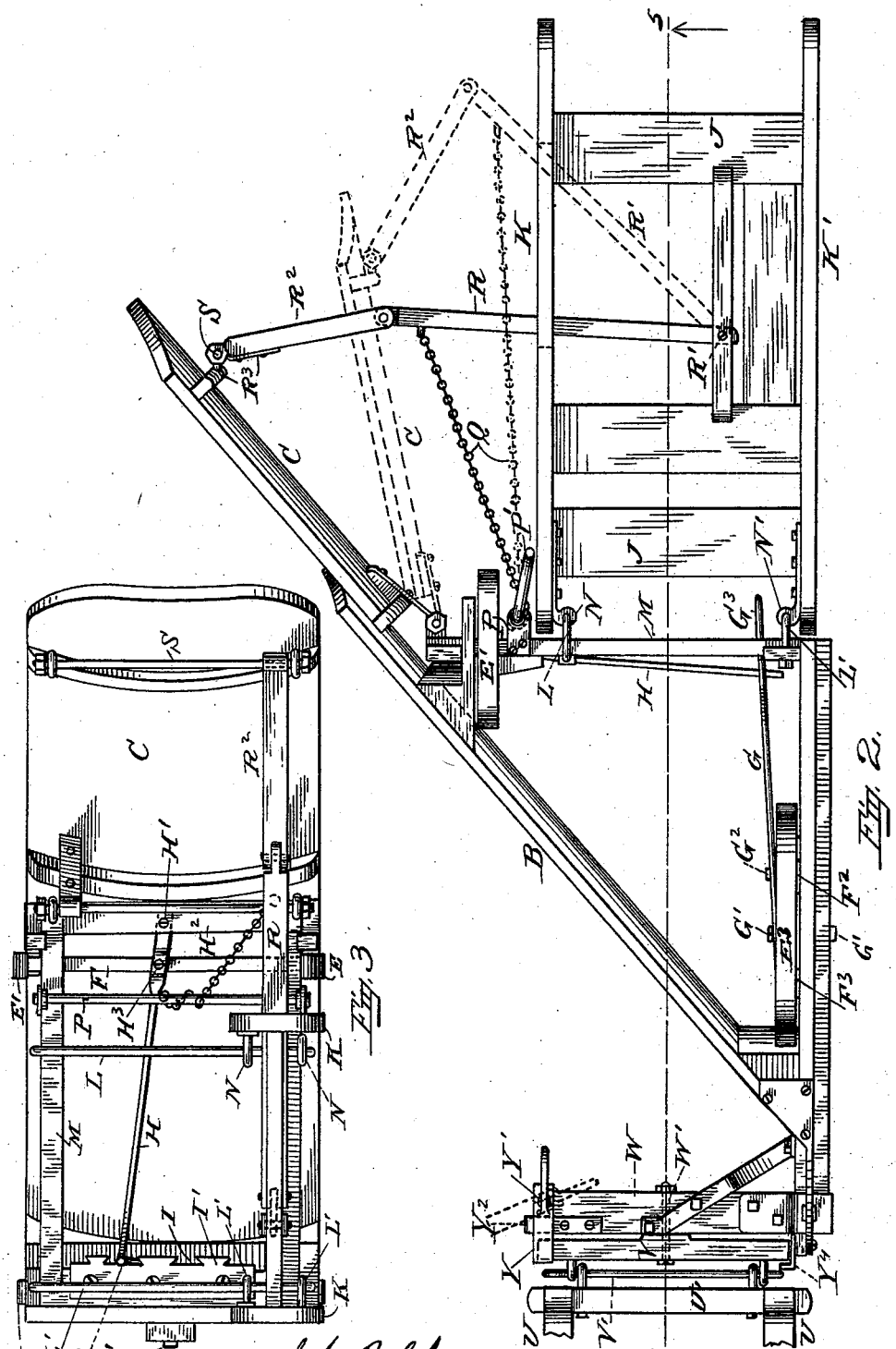

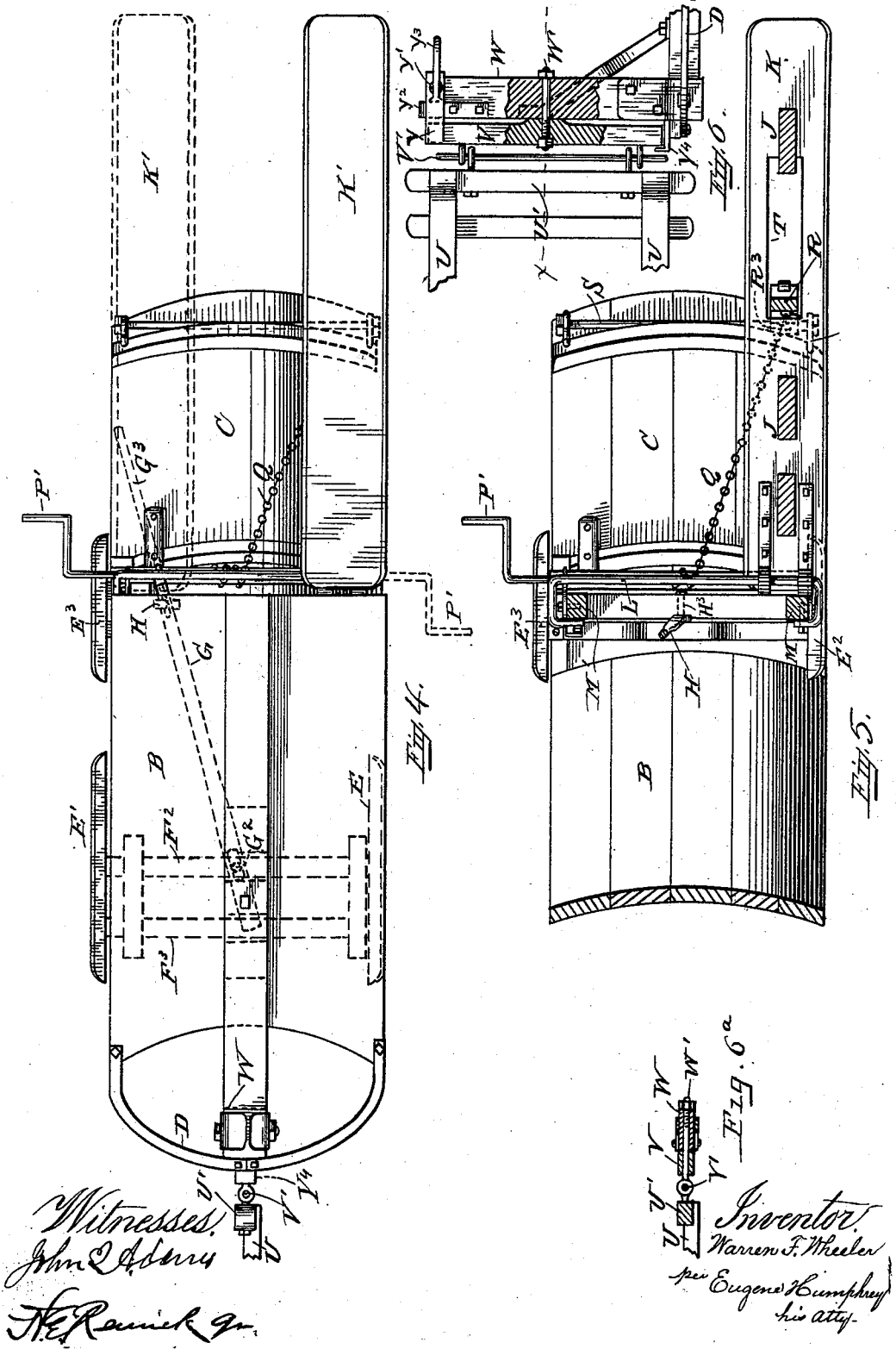

WARREN F. WHEELER, OF STONEHAM, MASSACHUSETTS.

SNOW-PLOW.

SPECIFICATION forming part of Letters Patent No. 539,106, dated May 14, 1895.

Application filed March 25, 1895. Serial No. 543,049. (No model.)

*To all whom it may concern:*

Be it known that I, WARREN F. WHEELER, of Stoneham, in the county of Middlesex and State of Massachusetts, have invented a new and useful Improvement in Snow-Plows, which will, in connection with the accompanying drawings, be hereinafter fully described, and specifically defined in the appended claims.

My present invention is an improvement upon the snow-plow described in Letters Patent of the United States No. 518,749, issued to me April 24, 1894; and has for its principal object to make the plow reversible so that the snow may be scraped thereby from the walk, either to the right or left, as may be required, without changing the direction of the plow; and the invention consists in the novelties in construction, arrangement and combination of its component parts, and its mode of operation, which are hereinafter more fully described, and pointed out in the appended claims.

Figure 1 is a perspective view of my improved snow-plow as seen from a point on the right thereof and as arranged to scrape the snow to the left. Fig. 2 is a plan of the same with the direction of the plow reversed and as arranged to scrape the snow to the right. Fig. 3 is a rear elevation of the plow as seen when in the position shown in Fig. 2. Fig. 4 is a side elevation of the same as seen from a point at the left of the plow when in the position shown in Fig. 2. Fig. 5 is a vertical section taken longitudinally, as on line 5 5, Fig. 2, and as seen from the left of said line. Fig. 6 is a detached portion of the draft devices, showing in plan and section how the shafts by which the plow is hauled are attached to the plow through a draw-bar secured by a pivotal bolt to the draft-beam of the plow. Fig. 6ᵃ is a vertical section on line *x x* of Fig. 6.

As in my said former patent the plow consists mainly of a substantial wooden frame having one short, straight side A. covered with plank, and a longer and oblique scraping side B. also covered with the plank, and having hinged thereto a wing C. In the present case said parts are properly outlined to adapt them to be reversed when the plow is turned over to change it from left to right or right to left.

The sides A. and B. converge and come together in a sharp curved front edge and are secured together at that point by a curved iron brace D which is bolted to the meeting edges of the plank sides at the top and bottom, and to the forward projecting frame timber as shown in Fig. 1, and also serves as a colter to the plow to cut the snow. This part of the plow which cuts into the snow and scrapes the same to one side, is constructed and arranged to be raised and lowered as occasion may require, and to have its wing swung inward and outward according to the width of the path to be cleared substantially as in my said former patent; but it is not mounted in the same manner upon one sled pivoted to another sled. It is provided with two pairs of reversible shoes E, E', E² and E³, the first pair being attached to the framework adjacent to the interior wall of the scraper B, by means of vertically sliding bars F, F', to the ends of which the shoes are secured so as to move therewith; and the second pair being similarly attached by means of sliding bars F² F³ to the interior wall of side A. These shoes or short runners stand parallel with each other and with side A. The upper and under edges of said sides, respectively, are alike and are properly shod, or covered with iron, to protect the bearing surfaces of their runners and scraping edges; and like protection is afforded to the said reversible short runners. These runners are in contact with the surface of the street or sidewalk only when the plow is raised and mounted thereon, which is done by forcing the runners down. This operation is accomplished by means of a lever G, shown in Fig. 2, and by dotted lines in Fig. 4, which is pivoted by a bolt G'. to side A between the bars F² and F³ and connected by a pin G² to bar F². A similar lever H extending at right angles to lever G, is pivoted by a bolt H' to the vertical frame timber H² as shown in Fig. 3 and is connected by a stud H³ to the bar F of shoes E and E'. The free end of this lever H passes through a slot in lever G as shown in Fig. 2, and is thus moved with and by lever G. Lever G. is shortened and lengthened by means of a detachable section or handle G³ for a purpose which will be explained.

To raise the plow and support it on the shoes, whichever side is up, lever G. is pressed downward, carrying with it bars F² and F³ and the shoe which at the time is attached to the lower end of the bars, until the shoe bears upon the surface of the walk, when it will become, through pin G², the fulcrum of the lever over which the plow is raised by prying with the lever and thus lifting on G; and is supported upon the shoe through the lever when the latter is locked in the notches I of the plate I'; and when the lever G is thus operated it simultaneously operates lever H, causing the bars F, F', on the opposite side of the plow, to be likewise depressed, carrying one of their shoes to the ground, and raising that side of the plow and supporting it upon the shoe through the lever, in like manner as in the case of lever G; lever H. being locked in position through lever G when the latter is in one of the notches I of plate I'.

By releasing lever G from the notched plate and allowing it to rise, the plow will drop to the ground ready for practical work, while the bars carrying the shoes will slide in their bearings on the side of the plow and offer no resistance to the falling of the latter, which relieves the shoes of its support. When thus operating the plow the operator stands upon the floor planks of the sled J the runners K, and K' of which are formed and shod alike on their upper and under edges so as to be reversible. This sled is secured to vertical rods L, L', bent partly around and bolted to the cross beams M, M' of the plow frame; said rods passing through the eyes N, N' of plates bolted in pairs to the inner faces of the front ends of the runners. Sled J, has a free vertical play upon the rods L, L', but no independent lateral movement; and when the plow is reversed by inversion, or turning it over, the sled is also reversed and in the overturning is raised to the height of the top of the plow, from the ground, as indicated by the dotted runner in Fig. 4, whence it slides by its gravity down the rods to the ground again. The object of making a section G³ of the outer end of lever G. detachable as before referred to, will now be readily understood, namely: to be able to remove it from the path of the sled during such vertical movement after the plow is reversed. The wing C hinged to side B as clearly shown in Figs. 1 and 3, of the plow, is operated from the platform of the sled by means of a vertical rod P supported in bearings secured to the cross beams M, and M', and having a detachable crank P', fitted to work on either end of the rod and removable when the parts are reversed with the plow, as indicated in Fig. 4. A chain Q is secured at one end to rod P and at its opposite end to a lever R. pivoted at one end to the floor timber of the sled at R', and at its opposite end jointed to an arm R², which has an eye plate R³, bolted thereto, through which eye a vertical rod S passes and is secured at its ends to wing C in such manner as to allow free vertical movement of eye R³ up and down rod S, so that when the sled is reversed as before described said wing attachments may move vertically with the sled. Lever R is supported by, and moves in, a slot T in runner K, and, when the crank P' is practically operated it is so turned as to wind the chain Q around rod P and thus draw lever R toward the rod, thereby through arm R² forcing the wing outward against the resistance of the snow, and holding it in line with side B. Then by relaxing the chain it will allow wing C to be forced inward by the resistance of the snow to a greater or less extent according to the adjustment of the chain to the sweep which it is desired that the plow shall make in the snow, and as indicated by dotted lines in Fig. 2. Sled J, besides constituting a platform from which the plow is operated, as described, also affords a necessary resistance to the crowding of the long scraping side B and wing C toward the rear of the shorter side A, and thus helps, by counteracting such tendency of the scraper to crowd over, to guide and keep the plow in its proper course.

To enable the plow to be reversed without detaching the draft shafts U, I attach the latter to a draw-bar by means of eye-bolts secured to said bar and like bolts secured to the cross bar U' and a rod V' extending through said eyes as clearly shown in Figs. 1, 2, and 6. Bar V is secured to a draft beam W extended laterally from the front of the plow, by a bolt W' passing through the beam W and bar V so that the latter may turn freely thereon when not held in a horizontal position by the pivoted clasp Y which embraces the end of the bar V and may be turned on a stud Y' in beam W, so as to release the bar. It is secured from accidental turning by a retaining spring Y², and is provided with an arm Y³ extended rearward by which the clasp may be handily turned, as indicated by dotted lines in Fig. 2, and bar V released therefrom. When thus released, the plow, together with beam W and clasp Y, may be reversed by turning them upside down, without affecting the position of bar V and the shafts connected therewith; and when the plow is thus reversed the clasp may be swung in position again to support the opposite end of the draw-bar V. An angle iron Y⁴ extends from the draw beam W around the end of bar V, whichever side up the plow may be, in such manner as to support the bar against the strain of the shafts in moving the plow, and does not interfere with the reversal of the plow and the consequent exchange of positions of the clasp Y and iron Y⁴ relatively to the ends of bar V.

When the plow is being practically used the operator stands upon the plank floor of sled J and reins the horse or horses employed to haul the same, and he regulates the width of the path scraped by the plow by manipulating crank P'. If he desires to scrape a wide path he turns crank P' so as to wind chain Q around rod P, thereby drawing lever R toward said rod and thus forcing arm R² against wing C and pushing the latter outward against the resistance of the snow. By a reverse movement of crank P' he slackens the chain to any extent desired, and allows the wing to yield to the pressure of the snow and thus narrow the path of its operations. To raise the plow for any purpose and suspend its scraping operations upon the street or side walk, he depresses lever G, which carries down with it lever H, and through the connections already described forces down the shoes or short runners, E' and E³, if the plow is scraping to the left as shown in Fig. 1, or shoes E and E², if the plow is reversed and scraping to the right as in Fig. 2, and when the shoes bear upon the walk, a further depression of lever G, then prying over the shoes as its fulcrum, will raise the plow to the extent desired; and by locking the lever G in the notches I of plate I' the plow will be securely held suspended upon said shoes, so that it may be hauled about upon them.

To change the plow from a left hand to a right hand scraper, the operator removes crank P' from rod P, and extension handle G³ from lever G, and then turns the plow and its sled attachment J, upside down, (all said parts being adapted to work either side up,) when the scraper will be on the right of the straight side of the plow, and by replacing handle G³ on lever G, and putting crank P' on the reversed end of rod P, the plow will be ready for operation as before. In thus turning the plow it swivels on bolt W', which passes through draft beam W and draw-bar V, without disturbing the bar V, the same having first been released from clasp Y. The sled J, in this inverting movement, is raised to the height of the plow sides together with its wing operating levers, but when thus turned over the sled slides down rods L and L' to the ground, by its gravity, and carries down arm R² on rod S attached to wing C. These constitute the principal practical operative adjustments and movements of the plow.

I claim—

1. A snow plow embodying the combination substantially as described, of two suitably outlined, reversible sides A and B, which converge and meet at their front ends in a properly curved brace D; a frame-work M, by which the rear ends of the sides are connected and supported; a reversible sled J arranged to travel in the rear of, and in line with, side A, and so attached to frame M, as to have a freedom of vertical, but no independent lateral movement; a corresponding wing C hinged to side B and connected by a jointed lever to the sled; and means for operating said lever to move and adjust the wing for the purposes specified.

2. In a snow-plow comprising two converging sides, as A and B, the combination with each of said sides of a shoe, or short runner, as E; the two runners being parallel with each other and with side A, and each adapted to be moved vertically, independently of its side of the plow; and means for depressing the shoes to the ground and raising and supporting the plow thereon, substantially as and for the purposes specified.

3. In a snow-plow comprising two converging and reversible sides, as A and B, the combination with each of said sides of a pair of reversible shoes, as E and E', the two pairs of shoes being parallel with each other and with side A, and each pair constructed and arranged to be moved vertically independently of its side of the plow; and mechanism reversible with the plow, adapted to depress one of the shoes of each pair simultaneously to the ground, and to raise and support the plow thereon, substantially as and for the purposes specified.

4. In combination the converging sides A and B, the curved brace D, by which the meeting edges of said sides are secured together; frame M by which the rear ends of said sides are connected and supported; sled J arranged in the rear of, and in line with side A; rods L and L' by which the sled is attached to frame M; wing C, hinged to side B; rod S, arm R² and lever R by which the wing is connected with the sled as shown; and the crank P' and chain Q connected with lever R, whereby the wing is moved; all substantially as specified.

5. In combination substantially as described, sides A and B; brace D; frame M; reversible shoes E and E' attached to vertically movable bars F and F'; reversible shoes E² and E³ attached to vertically movable bars F² and F³; lever H pivoted to the vertical frame timber H², and also pivotally connected with the movable bar F, and extended across the plow and passed through lever G; lever G pivoted to side A and connected by a pin G² with the vertically movable bar F²; and the notched locking plate I, secured to the frame, whereby lever G is locked in position when the plow is raised and supported thereby on said shoes, for the purposes specified.

6. In combination, the draft-beam W attached to, and extended laterally in front of, the plow; the draw-bar V connected with the shafts by which the plow is hauled; the bolts W' passed through the draft beam and draw-bar forming a pivotal or swivel connection between the two parts; the clasp Y embracing the end of bar V, and pivoted to beam W; and the retaining spring Y² for preventing accidental displacement of the clasp; all substantially as and for the purposes specified.

WARREN F. WHEELER.

Witnesses:
JOHN Q. ADAMS,
EUGENE HUMPHREY.